I. B. Staples,
Bracelet Blank.
No. 106,740.  Patented Aug. 23, 1870.
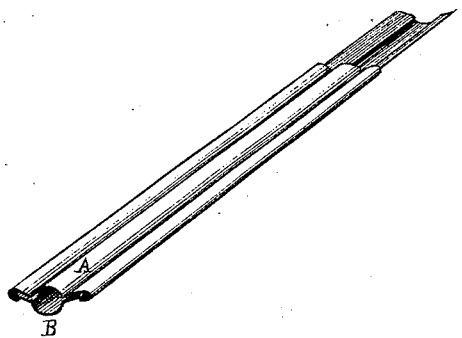
Witnesses
L. M. Stanley
Lewis C. Hawkins
Inventor
Isaac B. Staples

United States Patent Office.

ISAAC B. STAPLES, OF ATTLEBOROUGH, MASSACHUSETTS.

Letters Patent No. 106,740, dated August 23, 1870.

IMPROVEMENT IN STOCK OR BLANK FOR BRACELETS.

The Schedule referred to in these Letters Patent and making part cf the same.

I, ISAAC B. STAPLES, of Attleborough, in the county of Bristol and State of Massachusetts, have invented an Improved Stock or Blank for Bracelets, of which the following is a specification.

The object of my invention is to form the material of which the bracelets are to be composed in such a manner as not to require the aid of solder in their construction, and to conceal the edges from view; also, to lessen the expense of manufacture.

The accompanying drawing is a perspective view of my invention.

A represents the upper part, and forms the outside of the bracelet.

B is that part which forms the inside or lining.

The edges of A are bent downward and inward, so as to cover the edges of B, and fasten the two together.

The two parts are so formed as to leave a longitudinal opening between them through the center, for the purpose of receiving an elastic cord, made use of in making the bracelets.

The two pieces A and B, which comprise my improvement, are formed separate, and put together by introducing one end of B inside of the bent edges of A, and forcing them together, when they are firmly united by closing the edges of A.

I claim—

The stock or blank, composed of the parts A and B, constructed and united as shown and described.

ISAAC B. STAPLES.

Witnesses:
L. M. STANLEY,
L. O. HAWKINS.